US012604135B2

(12) United States Patent
Wang et al.

(10) Patent No.: US 12,604,135 B2
(45) Date of Patent: Apr. 14, 2026

(54) SOUND PRODUCING APPARATUS AND WEARABLE SOUND DEVICE

(71) Applicant: xMEMS Labs, Inc., Santa Clara, CA (US)

(72) Inventors: Huann-Yau Wang, Taichung City (TW); Chia-Wen Lee, New Taipei City (TW)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/287,776

(22) Filed: Jul. 31, 2025

(65) Prior Publication Data

US 2026/0046550 A1 Feb. 12, 2026

Related U.S. Application Data

(60) Provisional application No. 63/680,633, filed on Aug. 8, 2024.

(51) Int. Cl.

| | |
|---|---|
| ***H04R 1/02*** | (2006.01) |
| ***H04R 1/10*** | (2006.01) |
| ***H04R 1/28*** | (2006.01) |
| ***H04R 1/34*** | (2006.01) |
| ***H04R 19/02*** | (2006.01) |
| ***H04R 23/00*** | (2006.01) |

(52) U.S. Cl.

CPC ........... *H04R 1/2811* (2013.01); *H04R 1/025* (2013.01); *H04R 1/1016* (2013.01); *H04R 1/345* (2013.01); *H04R 19/02* (2013.01); *H04R 23/00* (2013.01); *H04R 2201/003* (2013.01); *H04R 2217/03* (2013.01)

(58) Field of Classification Search

CPC .... H04R 1/025; H04R 1/1016; H04R 1/2811; H04R 23/00; H04R 7/06; H04R 1/345; H04R 19/02; H04R 2201/003; H04R 2217/003

See application file for complete search history.

(56) References Cited

U.S. PATENT DOCUMENTS

| | | | | |
|---|---|---|---|---|
| 11,943,585 | B2 | 3/2024 | Liang | |
| 12,151,934 | B2 * | 11/2024 | Lu | H04R 31/00 |
| 2022/0225032 | A1 * | 7/2022 | Liang | H04R 19/02 |
| 2022/0315412 | A1 * | 10/2022 | Liang | B81B 3/0072 |
| 2023/0209241 | A1 * | 6/2023 | Lo | H04R 1/1041 381/328 |
| 2024/0251199 | A1 | 7/2024 | Liang | |

FOREIGN PATENT DOCUMENTS

| | | | |
|---|---|---|---|
| CN | 118382045 | A | 7/2024 |
| EP | 4 283 610 | A1 | 11/2023 |

* cited by examiner

*Primary Examiner* — Huyen D Le

(74) *Attorney, Agent, or Firm* — Winston Hsu

(57) ABSTRACT

A sound producing apparatus includes an airflow generator configured to generate an airflow, a first resonance chamber and a second resonance chamber. The second resonance chamber is stacked on the first resonance chamber. A sound is produced via the airflow generated by the airflow generator passing through the first resonance chamber and the second resonance chamber.

22 Claims, 6 Drawing Sheets

SOUND PRODUCING APPARATUS AND WEARABLE SOUND DEVICE

CROSS REFERENCE TO RELATED APPLICATIONS

This application claims the benefit of U.S. Provisional Application No. 63/681,167, filed on Aug. 9, 2024. Further, this application claims the benefit of U.S. Provisional Application No. 63/680,633, filed on Aug. 8, 2024. The contents of these applications are incorporated herein by reference.

BACKGROUND OF THE INVENTION

1. Field of the Invention

The present application relates to a sound producing apparatus and a wearable sound device, and more particularly, to a sound producing apparatus and a wearable sound device enhancing SPL.

2. Description of the Prior Art

Unless otherwise indicated herein, the approaches described in this section are not prior art to the claims in this application and are not admitted as prior art by inclusion in this section.

In the field of sound reproduction, particularly concerning compact and wearable devices, certain challenges persist in achieving optimal acoustic performance. Existing sound producing apparatuses frequently encounter limitations in generating sufficient sound pressure levels (SPL) and maintaining acoustic efficiency, especially within constrained form factors. This can result in a diminished audio output that may not fully meet desired performance benchmarks.

A contributing factor to these challenges often lies in the acoustic characteristics. Instances have been observed where the internal acoustic pathways or structures within a sound producing apparatus do not adequately arrange the acoustic characteristics. Consequently, the ability to effectively amplify sound pressure is constrained, leading to an output that, while functional, may not deliver the anticipated acoustic impact. Such scenarios underscore a continuing objective within the field: to refine the acoustic performance of sound producing apparatuses, particularly in terms of elevating sound pressure levels.

Therefore, effectively refining the acoustic characteristics of a sound producing apparatus to achieve higher SPL is a significant objective in the field.

SUMMARY OF THE INVENTION

It is therefore a primary objective of the present application to provide a sound producing apparatus and a wearable sound device, to improve over disadvantages of the prior art.

An embodiment of the present application provides a sound producing apparatus. The sound producing apparatus includes an airflow generator configured to generate an airflow; a first resonance chamber and a second resonance chamber. The second resonance chamber is stacked on the first resonance chamber. A sound is produced via the airflow generated by the airflow generator passing through the first resonance chamber and the second resonance chamber.

An embodiment of the present application also provides a wearable sound device. The wearable sound device comprises a housing and a sound producing apparatus. The sound producing apparatus includes an airflow generator configured to generate an airflow; a first resonance chamber and a second resonance chamber. The second resonance chamber is stacked on the first resonance chamber. A sound is produced via the airflow generated by the airflow generator passing through the first resonance chamber and the second resonance chamber.

These and other objectives of the present invention will no doubt become obvious to those of ordinary skill in the art after reading the following detailed description of the preferred embodiment that is illustrated in the various figures and drawings.

DETAILED DESCRIPTION

Content of U.S. Pat. No. 11,943,585 is incorporated herein by reference.

Figure 1:
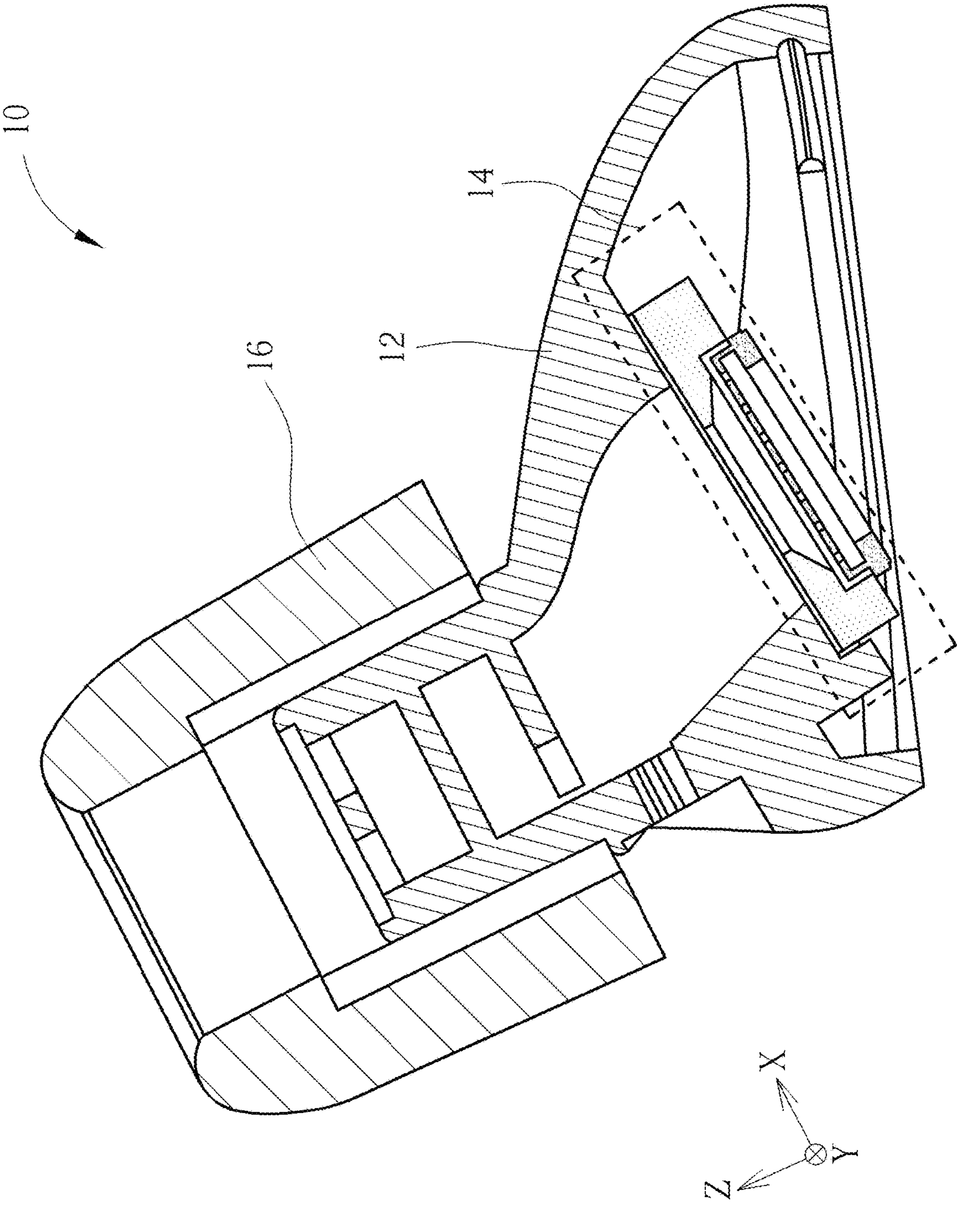
FIG. 1 is a schematic diagram of a cross-sectional view of a wearable sound device according to an embodiment of the present invention.
Figure 2:
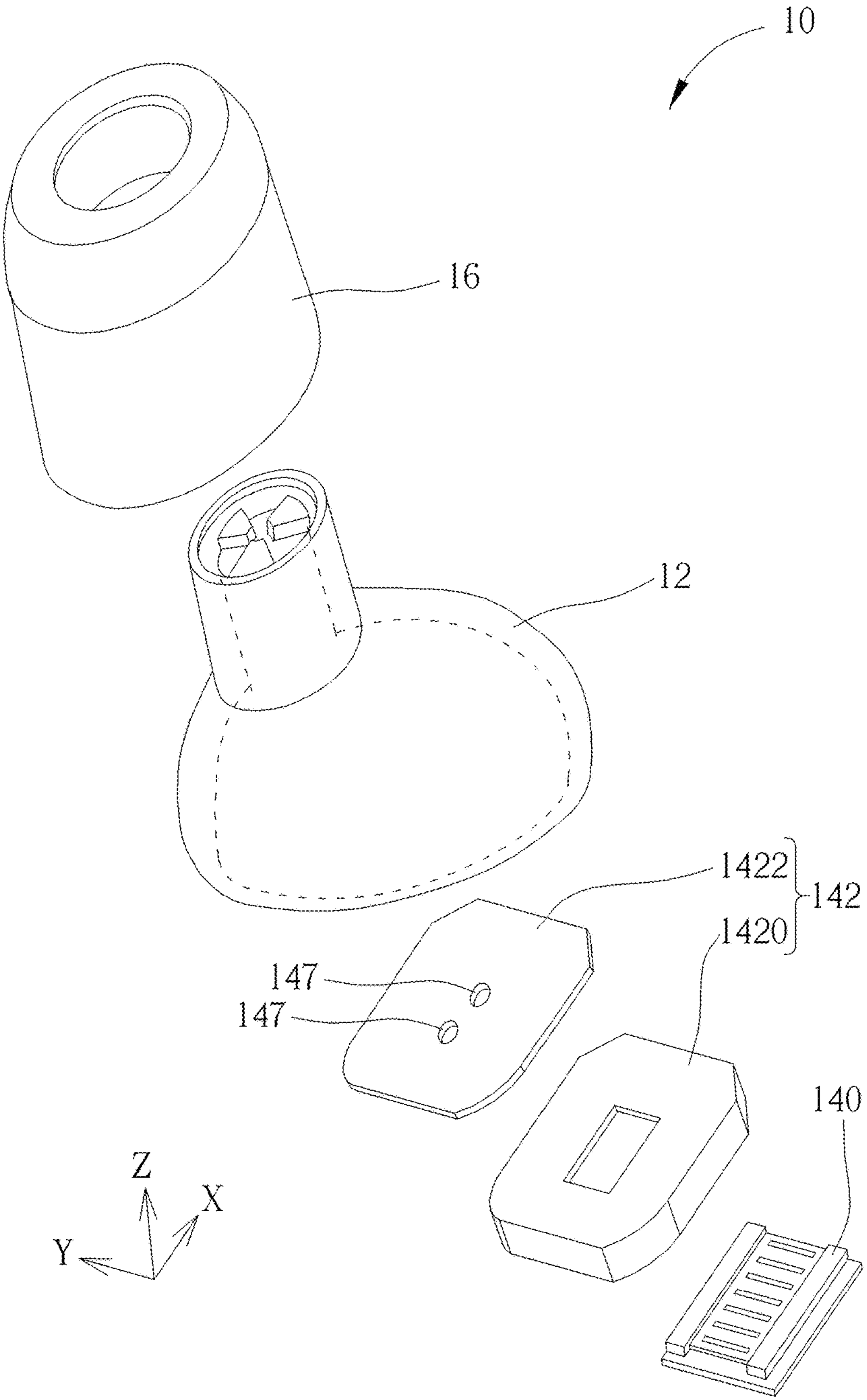
FIG. 2 is a schematic diagram of an exploded view of the wearable sound device of FIG. 1.
Figure 3:
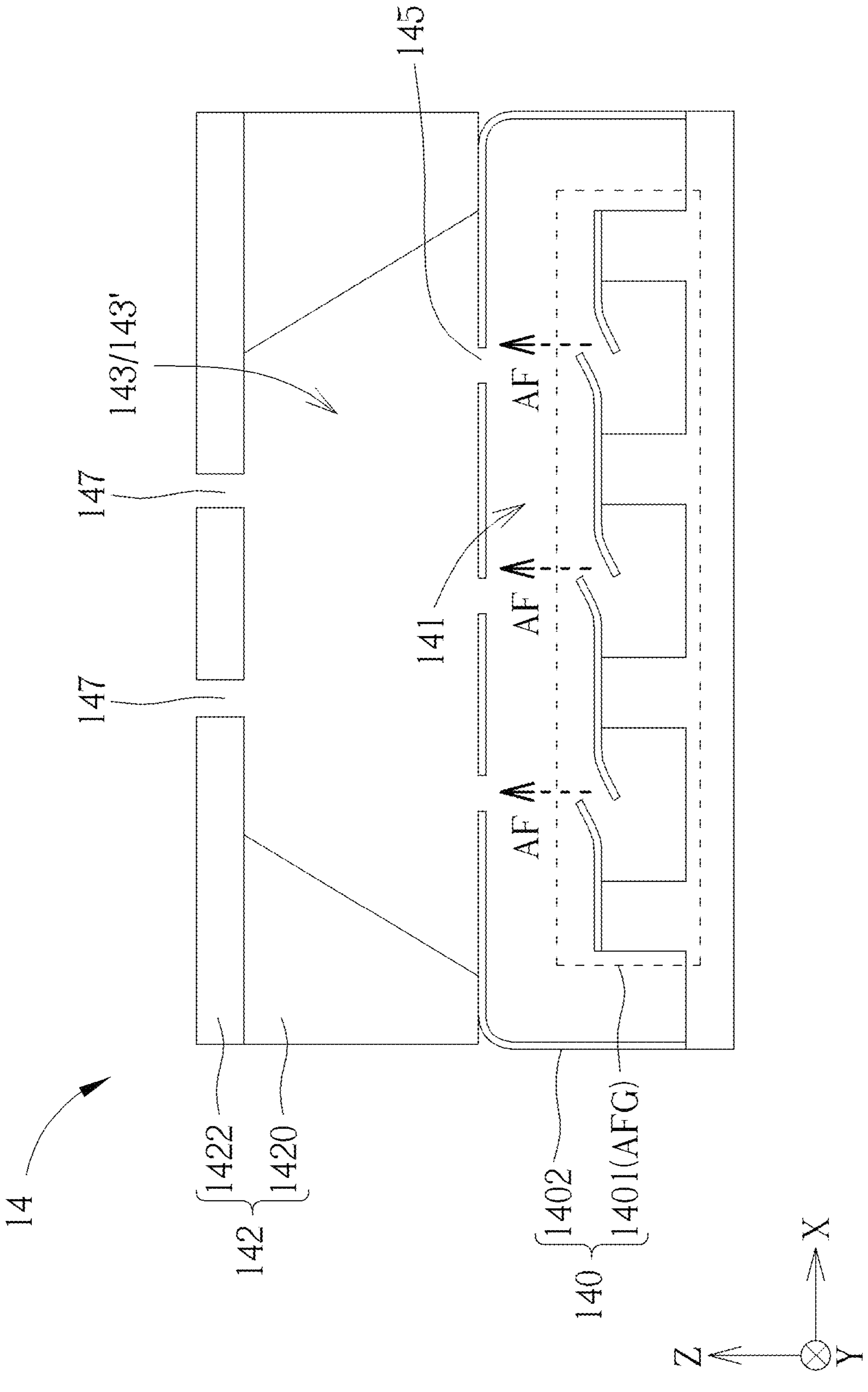
FIG. 3 is a schematic diagram of a sound producing apparatus according to an embodiment of the present invention.
Figure 4:
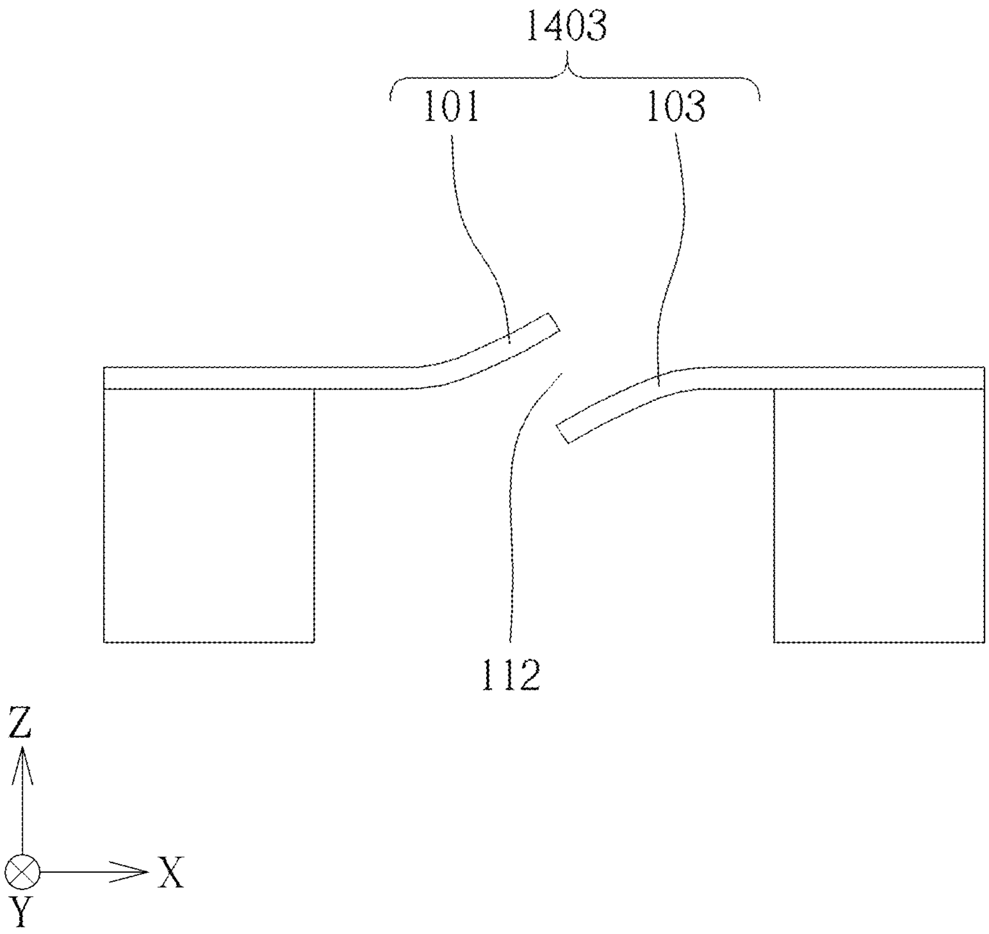
FIG. 4 is a schematic diagram of a sound producing device according to an embodiment of the present invention.

FIG. 1 is a schematic diagram of a cross-sectional view of a wearable sound device 10 according to an embodiment of the present invention. FIG. 2 is a schematic diagram of an exploded view of the wearable sound device 10. FIG. 3 is a schematic diagram of a sound producing apparatus 14 according to an embodiment of the present invention. FIG. 4 is a schematic diagram of a sound producing device 1401 according to an embodiment of the present invention.

The sound producing apparatus 14 comprises an airflow generator AFG, a first resonance chamber 141 and a second resonance chamber 143. The first resonance chamber 141 and the second resonance chamber 143 are stacked together. The airflow generator AFG is configured to generate an airflow AF. In an embodiment, the airflow generator AFG may comprise an air-pulse generating device, denoted as 1401, disclosed in U.S. Pat. No. 11,943,585.

Specifically, the sound producing apparatus 14 comprises (or can be viewed as comprising) an air-pulse generating package 140, including the air-pulse generating device 1401 and a first covering structure 1402, and a second covering structure 142.

The first resonance chamber 141 is formed between (a film structure or a flap pair of) the air-pulse generating device 1401 and the first covering structure 1402. The air-pulse generating package 140 is configured to produce a plurality of air pulses at an ultrasonic frequency.

The second covering structure 142 is disposed on the air-pulse generating package 140. The second resonance chamber 143 is formed within the second covering structure 142 or between the air-pulse generating package 140 and the second covering structure 142. The second resonance chamber 143 may enhance an acoustic impedance of the sound producing apparatus at the ultrasonic frequency. The second covering structure 142 further comprises a sealing structure

1420 and a covering layer 1422. In an embodiment, the sealing structure 1402 may be a gasket. A hollow cavity 143' is formed within the sealing structure 1420 (where the hollow cavity 143' emphases the empty space formed within the gasket or the sealing structure, and the second resonance chamber 143 emphases its resonance effect enhancing acoustic impedance). The covering layer 1422 covers the sealing structure 1420. Due to the hollow cavity 143', the second resonance chamber 143 is formed between the covering layer 1422, the sealing structure 1420, and the first covering structure 1402. The diameter of the hollow cavity 143' within the sealing structure 1420 can be gradually narrowed from the first covering structure 1402 to the covering layer 1422. In an embodiment, the covering layer 1422 may comprise a plastic layer, a polymer layer, or a polyester layer. In an embodiment, the covering layer 1422 may be made of or may comprise Mylar or BoPET (biaxially-oriented polyethylene terephthalate), but not limited thereto.

The first covering structure 1402 comprises a plurality of first outlets 145 formed on its top side. Furthermore, the second covering structure 142 includes at least a second outlet 147 formed on its top side. Hence, the first resonance chamber 141 may form a first Helmholtz resonance and the second resonance chamber 143 may form a second Helmholtz resonance. The sound producing apparatus 14 can be regarded as comprising the first (Helmholtz) resonance chamber 141 and the second (Helmholtz) resonance chamber 143 stacked together.

In an embodiment, the air-pulse generating device 1401 comprises the flap pair 1403, which includes a first flap 101 and a second flap 103 positioned opposite to each other. A slit 112 is formed between the first flap 101 and the second flap 103. The flap pair 1403 performs a differential movement to form an opening 112 at the ultrasonic frequency, with the opening 112 being formed due to the slit 112.

In a perspective, the flap pair 1403 forms a virtual valve 112. The virtual valve 112 can be viewed as the slit 112 when the virtual valve 112 is in a closed/sealed status (where acoustic resistance is so large such that airflow therethrough is negligible). The virtual valve 112 can be viewed as the opening 112 when the virtual valve 112 is in an open status (where acoustic resistance is so small such that airflow therethrough is significant).

Additionally, the flap pair 1403 may perform both a common mode movement and the differential movement. Due to the common mode movement and the differential movement performed by the flap pair 1403, the air-pulse generating device 1401 produces the plurality of air pulses, specifically, a plurality of airflow pulses.

In a perspective, the airflow generator AFG comprises the air-pulse generating device 1401, and the airflow AF generated by the airflow generator AFG comprises the plurality of airflow pulses generated by the air-pulse generating device 1401.

Operation details of the air-pulse generating device 1401 may be further referred to U.S. Pat. No. 11,943,585, which is not narrated herein for brevity.

The sound producing apparatus 14 may be disposed within a wearable sound device. The wearable sound device of the present invention may be a wearable device which can produce sound. The wearable sound device of the present invention may be earbud, earphone, hearing aid, smart watch, smart glasses, AR/VR/MR/XR device (where AR/VR/MR/XR represents augmented/virtual/mixed/extended reality), etc.

According to the embodiment shown in FIG. 1, the wearable sound device 10 is an earbud, which comprises a housing 12 and the aforementioned sound producing apparatus 14.

The wearable sound device 10 can further comprise an ear tip 16, making it an in-ear wearable sound device.

Figure 5:
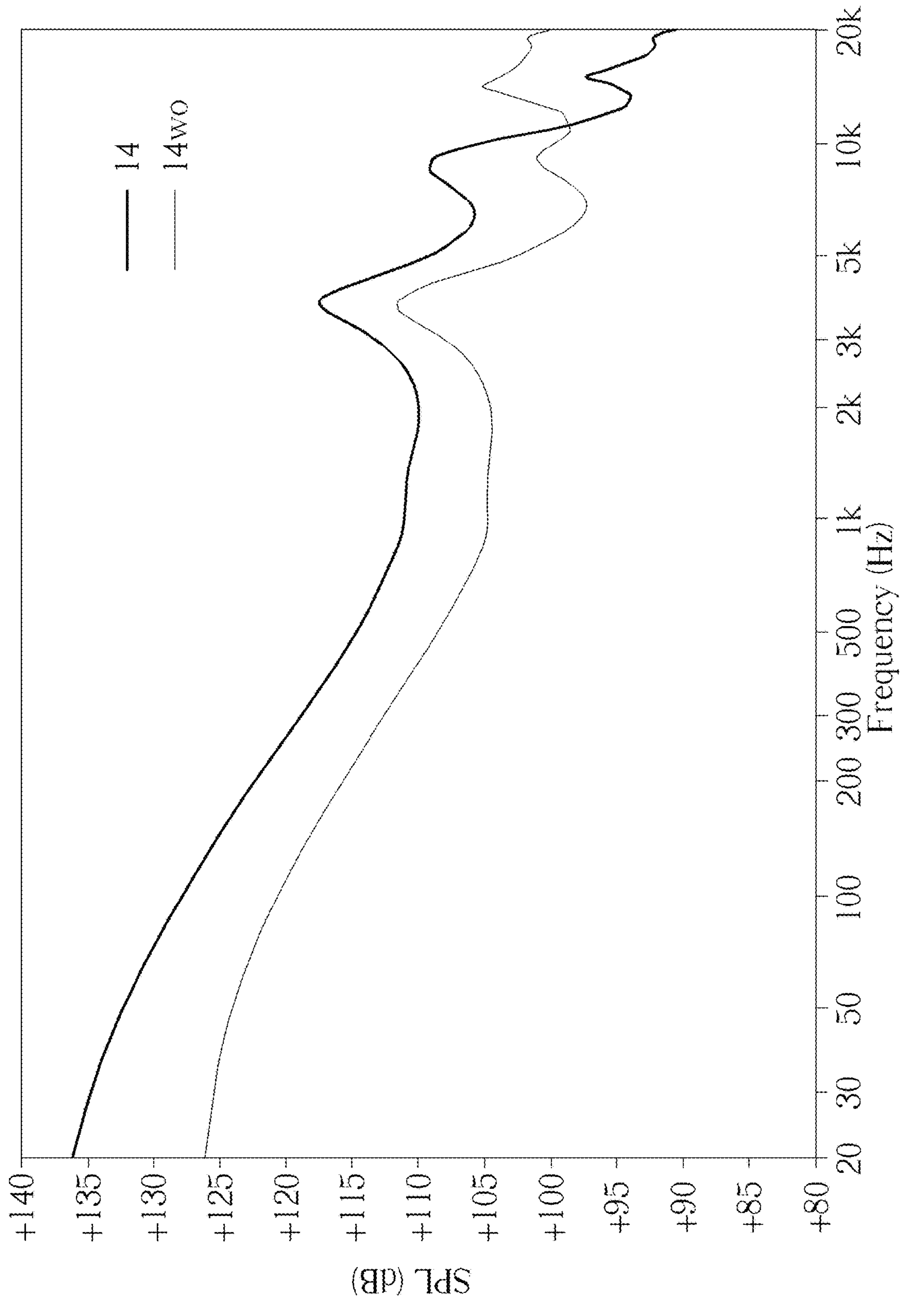
FIG. 5 illustrates performance curves of the sound producing apparatus of FIG. 3.
Figure 6:
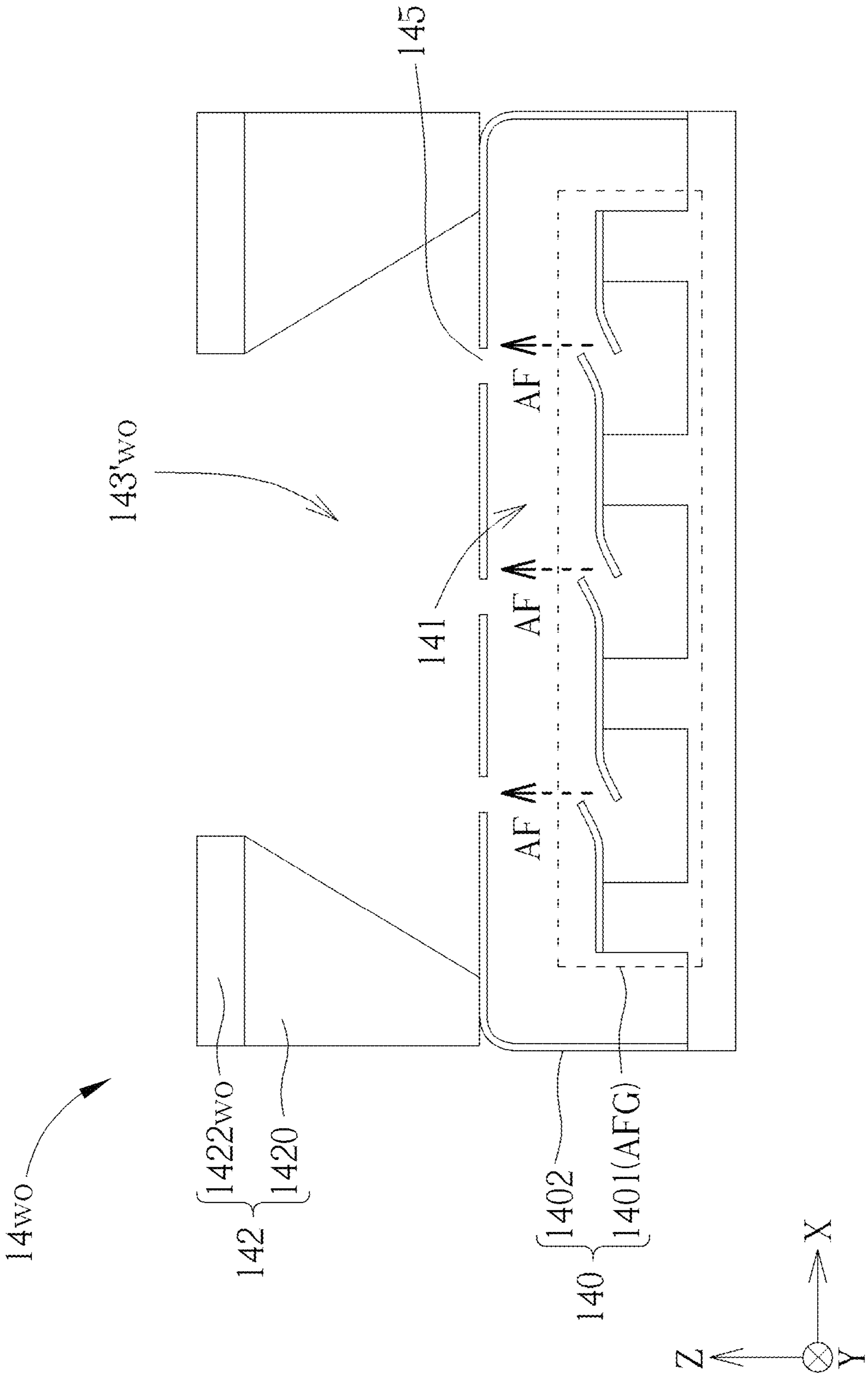
FIG. 6 illustrates a schematic diagram of a sound producing apparatus for comparison.

Performance enhancement of the sound producing apparatus 14 can be validated by FIG. 5, which illustrates curves of sound pressure level (SPL) of the sound producing apparatus 14 (with second (Helmholtz) resonance chamber stacked) versus a sound producing apparatus 14*wo* (without second resonance chamber), where the sound producing apparatus 14*wo* is shown in FIG. 6. In FIG. 6, a hollow cavity 143'*wo* within the sound producing apparatus 14*wo* is too opened to form (Helmholtz) resonance therewithin. The hollow cavity 143'*wo* is not able to achieve an effect of enhance acoustic impedance, and therefore not able to raise SPL accordingly.

In comparison, given the air-pulse generating package 140 produces airflow pulses, the second resonance chamber 143 stacked on/over the first resonance chamber 141, with Helmholtz resonance, would effectively enhance acoustic impedance (especially at the ultrasonic frequency) of the sound producing apparatus 14, resulting in more sound pressure. As can be seen from FIG. 5, the sound producing apparatus 14 with two stacked (Helmholtz) resonance chambers would have 5-7 dB performance gain, in terms of SPL, over the sound producing apparatus 14*wo* without stacked resonance chambers.

Those skilled in the art will readily observe that numerous modifications and alterations of the device and method may be made while retaining the teachings of the invention. Accordingly, the above disclosure should be construed as limited only by the metes and bounds of the appended claims.

For example, the sound producing apparatus is not limited to comprising two resonance chambers. The sound producing apparatus may comprise multiple (more than two) resonance chambers stacked together or stacked along a direction airflow flows through, which is within the scope of the present invention.

For example, apart from the first outlets 145 and the second outlet(s) 147, the second resonance chamber 143 may be substantially enclosed. The second outlet(s) 147 may be small enough to achieve Helmholtz resonance. Optionally, the dimension (e.g., the length, the width, or the diameter) of one second outlet 147 may be substantially close to or less than the dimension (e.g., the width or the diameter) of one first outlet 145 or one third of a cross-sectional area of the second resonance chamber 143. Optionally, the dimension (e.g., the length, the width, or the diameter) of one second outlet 147 may be a function of a resonant frequency or the volume of the second resonance chamber 143.

For example, the arrangement of the second outlet(s) 147 may be adaptively adjusted. Optionally, a projection of the second outlet(s) 147 onto the first covering structure 1402 may overlap or may not overlap the first outlets 145.

For example, a resonant frequency of the second resonance chamber 143 may optionally be a function of a resonant frequency of the first resonance chamber 141.

In summary, the present invention utilizes multiple stacked resonance chambers to raise acoustic impedance and therefore enhance SPL.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A sound producing apparatus, comprising:
an air-pulse generating package, comprising an airflow generator configured to generate an airflow and a first covering structure;
a first resonance chamber and a second resonance chamber; and
a second covering structure, disposed on the air-pulse generating package;
wherein the second covering structure comprises a sealing structure and a covering layer;
wherein the second resonance chamber is stacked on the first resonance chamber;
wherein a sound is produced via the airflow generated by the airflow generator passing through the first resonance chamber and the second resonance chamber.

2. The sound producing apparatus of claim 1,
wherein the airflow generator comprises an air-pulse generating device, configured to produce a plurality of airflow pulses at an ultrasonic frequency;
wherein the airflow comprises the plurality of airflow pulses.

3. The sound producing apparatus of claim 2,
wherein the air-pulse generating device comprises a flap pair, the flap pair comprises a first flap and a second flap opposite to each other.

4. The sound producing apparatus of claim 3,
wherein the flap pair performs a differential movement to form an opening at the ultrasonic frequency.

5. The sound producing apparatus of claim 3,
wherein the flap pair performs a common mode movement and a differential movement;
wherein the air-pulse generating device produces the plurality of airflow pulses via the flap pair performing the common mode movement and the differential movement.

6. The sound producing apparatus of claim 1, comprising:
wherein the first resonance chamber is formed between the airflow generator and the first covering structure.

7. The sound producing apparatus of claim 1,
wherein the first covering structure comprises a plurality of first outlets formed on a top side of the first covering structure.

8. The sound producing apparatus of claim 1, comprising:
wherein the second resonance chamber is formed within the second covering structure.

9. The sound producing apparatus of claim 1,
wherein a hollow cavity is formed within the sealing structure.

10. The sound producing apparatus of claim 9,
wherein the covering layer covers the sealing structure;
wherein the second resonance chamber is formed between the covering layer, the sealing structure and the first covering structure because of the hollow cavity.

11. The sound producing apparatus of claim 9,
wherein a diameter of the hollow cavity within the sealing structure is gradually narrow from the first covering structure to the covering layer.

12. The sound producing apparatus of claim 1, wherein the sealing structure is a gasket.

13. The sound producing apparatus of claim 1,
wherein the covering layer comprises a plastic layer, a polymer layer or a polyester layer.

14. The sound producing apparatus of claim 1,
wherein the second covering structure comprises at least a second outlet formed on a top side of the second covering structure.

15. The sound producing apparatus of claim 1,
wherein the second resonance chamber is configured to enhance an acoustic impedance of the sound producing apparatus at the ultrasonic frequency.

16. A wearable sound device, comprising:
a housing; and
a sound producing apparatus, comprising:
an air-pulse generating package, comprising an airflow generator configured to generate an airflow and a first covering structure;
a first resonance chamber and a second resonance chamber; and
a second covering structure, disposed on the air-pulse generating package;
wherein the second covering structure comprises a sealing structure and a covering layer;
wherein the second resonance chamber is stacked on the first resonance chamber;
wherein a sound is produced via the airflow generated by the airflow generator passing through the first resonance chamber and the second resonance chamber.

17. The wearable sound device of claim 16,
wherein the airflow generator comprises an air-pulse generating device, configured to produce a plurality of airflow pulses at an ultrasonic frequency;
wherein the airflow comprises the plurality of airflow pulses.

18. The wearable sound device of claim 17,
wherein the air-pulse generating device comprises a flap pair, the flap pair comprises a first flap and a second flap opposite to each other.

19. The wearable sound device of claim 18,
wherein the flap pair performs a common mode movement and a differential movement;
wherein the air-pulse generating device produces the plurality of airflow pulses via the flap pair performing the common mode movement and the differential movement.

20. The wearable sound device of claim 16, comprising:
wherein the first resonance chamber is formed between the airflow generator and the first covering structure.

21. The wearable sound device of claim 16, comprising:
wherein the second resonance chamber is formed within the second covering structure.

22. The wearable sound device of claim 16, comprising:
an ear tip;
wherein the wearable sound device is an in-ear wearable sound device.

* * * * *